United States Patent [19]
Posakony

[11] 3,741,004
[45] June 26, 1973

[54] ULTRASONIC CONTACT SCANNER

[75] Inventor: Gerald J. Posakony, Boulder, Colo.

[73] Assignee: Automation Industries, Inc., Century City, Calif.

[22] Filed: Feb. 16, 1971

[21] Appl. No.: 115,582

[52] U.S. Cl............................ 73/67.8 S, 73/71.5
[51] Int. Cl. ........................................ G01n 29/04
[58] Field of Search........................ 73/67.8 S, 71.5

[56] References Cited
UNITED STATES PATENTS

| | | | |
|---|---|---|---|
| 3,056,286 | 10/1962 | Gibson et al. | 73/67.8 S |
| 3,159,023 | 12/1964 | Steinbrecher | 73/67.8 S |
| 3,242,723 | 3/1966 | Evans | 73/67.9 |
| 3,403,671 | 10/1968 | Flaherty et al. | 73/67.8 S |
| 3,448,606 | 6/1969 | Flaherty et al. | 73/67.8 S |

Primary Examiner—Richard C. Queisser
Assistant Examiner—Arthur E. Korkosz
Attorney—Dan R. Sadler

[57] ABSTRACT

A contact scanner is described which is useful in an ultrasonic medical diagnostic system. The scanner includes a pivotally mounted search unit which includes a transducer mounted in a conical cylinder which is disposed to scan back and forth near the apex of the conical cylinder. The transducer is positioned at a spaced distance from the pivot point whereby the transducer is pivoted at the pivot point to provide a broad angle sweep of ultrasonic energy transmitted from the transducer through the cylinder.

10 Claims, 4 Drawing Figures

Gerald J. Posakony,
INVENTOR.

PATENTED JUN 26 1973    3,741,004
SHEET 2 OF 2
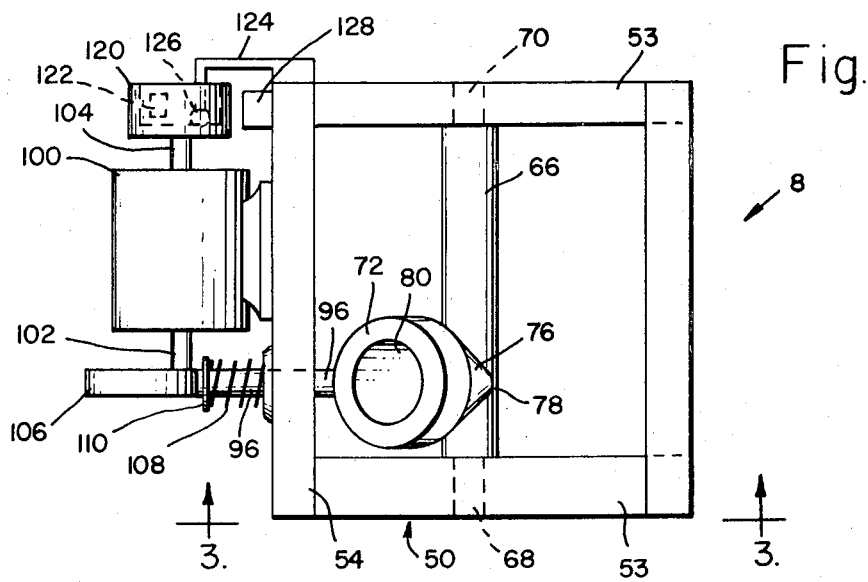
Fig. 2.
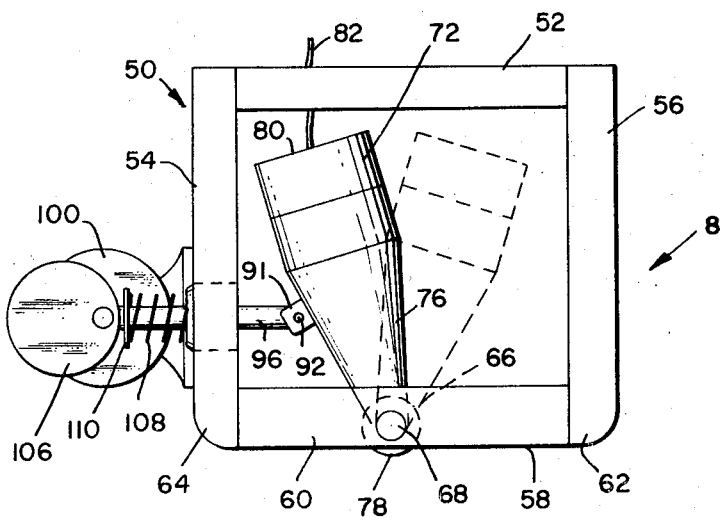
Fig. 3.
Fig. 4.
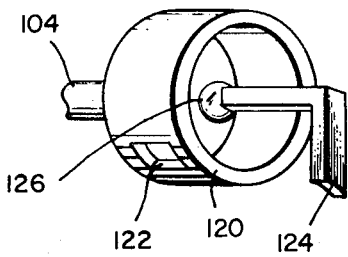
Gerald J. Posakony,
INVENTOR.
BY.
*Jan R Sadler*
ATTORNEY

ULTRASONIC CONTACT SCANNER

BACKGROUND OF THE INVENTION

1. Field of the Invention

This invention relates to medical scanning apparatus, and more particularly, to a novel and improved ultrasonic nondestructive scanning system which is useful in testing the internal conditions of the internal organs of a patient or the like.

Discussion of the Prior Art

In an ultrasonic nondestructive testing system, a search unit is used to transmit ultrasonic energy into a workpiece. Some of the energy is reflected from the front surface while a portion of the ultrasonic energy propogates into the workpiece. Reflections from certain internal structures within the workpiece are returned to the search unit. In ordinary metallic workpieces discontinuities such as deflect and flaw therein, cause these reflections. The return energy is then received by the test system. From this reception, it is possible to locate and position various internal structures or defects within a workpiece or body and are measured to determine various characteristics thereof. The ultrasonic energy may be transmitted into or through the workpiece or body in a wide variety of modes, such as longitudinal waves, compressional waves, surface waves, shear waves, etc. Test systems of this type are well known to those skilled in the art and, in effect, provide a search unit which comprises a transducer such as a piezoelectric crystal therein which vibrates when an electrical impulse is applied thereto. The vibrations are then in the form of mechanical motions and transmitted as ultrasonic sound waves through a suitable coupling such as water or glycerine, mineral oils or the like, into the workpiece. Upon striking a substructure in the workpiece, reflections therefrom are received by the same transducer and transmitted into electrical energy. These electrical energies then appear as vertical spikes displayed upon a cathode ray tube.

Recently it has been discovered that such a contact scanning unit can be used for medical diagnostic applications. Such equipment must pass a sonic transducer along the outer surface of the human body, keeping the transducer axis always in a vertical plane therewith, when transmitting ultrasonic energy into the area of the body being investigated. The transducer should be able to move at any point in the plane and pivot in an order to remain in contact with the patient's body surface at the intersection with the plane. The equipment has defined advantages over water path scanners in examining problems like pregnancy and the very sick patient who must remain on a stretcher.

Such equipment is capable of obtaining discreet echo information of medical diagnostic value simply by passing the transducer across the skin of the patient which is coated with a suitable couplant, such as mineral oil.

In prior art devices, it has always been necessary to place the patient in a somewhat awkward position to perform such medical diagnostic transducer inspections. Other methods in the prior art have included actually placing the patient in a tub or tank of water which can be used as a couplant and perform the searching techniques in this manner.

All of the prior art systems have basic disadvantages. Specifically they required a water path between the transducer and the anatomical part being examined. The patient that was being examined was immersed in the fluid tank or sitting against a fluid-filled tank with a plastic window. This inconvenient method prevented the study of patients unable to stand in a tube or sit in a stool.

There are described in the prior art, devices which perform some of the desired characteristics of ultrasonic testing of patients to perform medical diagnoses thereof. One such device can be found in the U.S. Letters Patent No. 3,086,390 issued to T. G. Brown and assigned to Automation Industries, Inc. Another device which is useful in such testing systems is found in the publication, "The American Journal of Medical Electronics," Pages 147 through 152, October-December Issue, Vol. No. 4, published by American Journal of Medical Electronics, Inc. These two prior art articles should give a good insight of the prior art which is now in use in medical electronics.

SUMMARY

Briefly described, the present invention includes in the embodiment described an oscillating scanner which is disposed in a frame. A search unit includes conical shaped cylinder which has the apex end of the conical cylinder pivotally mounted on a rod disposed near the bottom end of the frame. The search unit also includes an ultrasonic transducer disposed on the end opposite the apex and at a spaced distance therefrom. Means are provided to rock the cylinder back and forth at the pivot in the frame. Ultrasonic energy is then transmitted from the search unit into the workpiece disposed nearby and is scanned back and forth by the rocking search unit. Readout means are included which are responsive to the search unit for displaying reflections received thereby.

BRIEF DESCRIPTION OF THE DRAWINGS

These and other features and advantages will become more apparent to those skilled in the art when taken into consideration with the following detailed descriptions wherein like reference numerals indicate like and corresponding parts through the several views and wherein:

FIG. 2 is a top view of the scanner unit used in conjunction with the tester shown in FIG. 1;

FIG. 3 is a side view of the scanning unit when viewed along the lines 3—3 of FIG. 2; and FIG. 4 is a partial perspective view of the light and light wheel used in the indexing mode of the scanner shown in FIGS. 2 and 3.

DETAILED DESCRIPTION OF THE DRAWINGS

Figure 1:
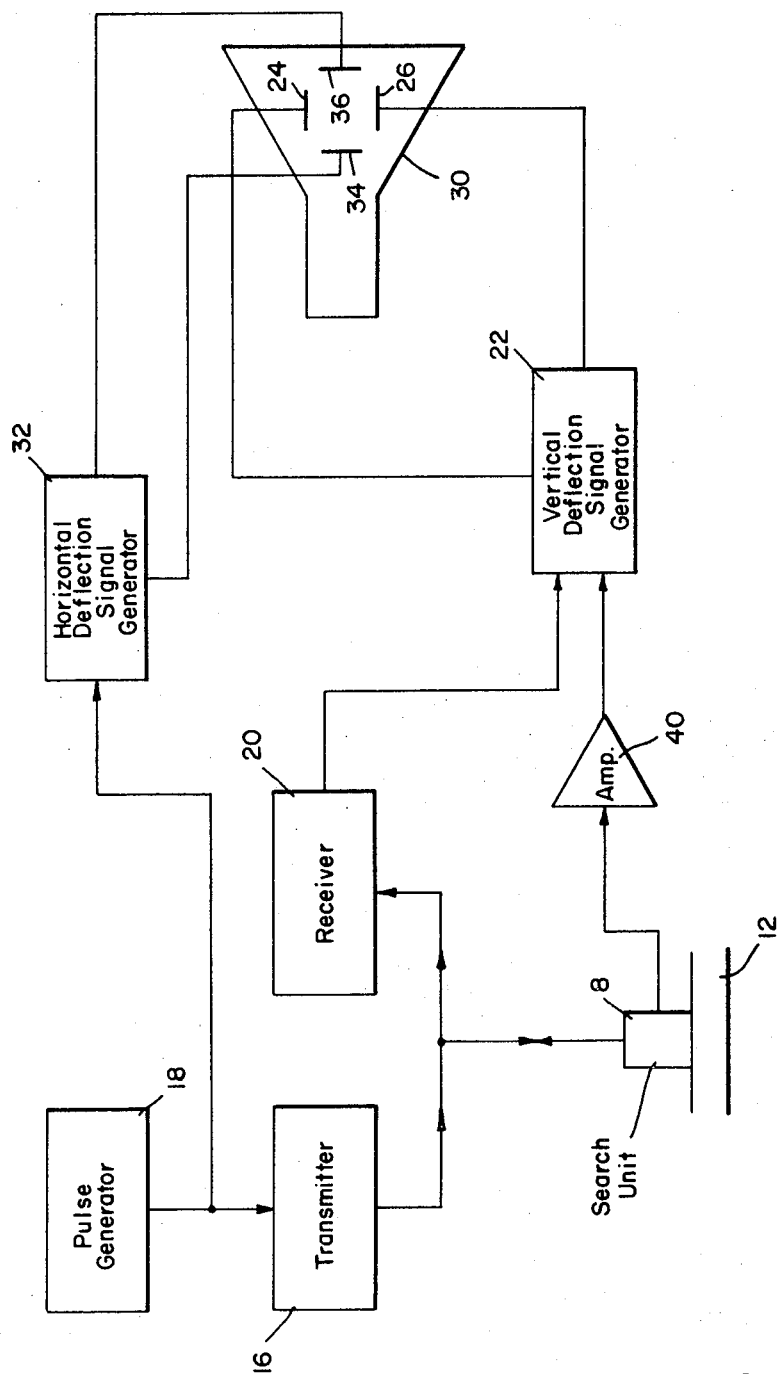
FIG. 1 is a block diagram schematic drawing of a nondestructive material tester using concepts of the present invention.

Referring first to FIG. 1, there is shown a search unit 8 which is acoustically coupled to a workpiece 12. In this embodiment, the workpiece 12 may be in the form of a human body whereby the search unit 8 is coupled to the patient 12 by use of a couplant in the form of a mineral oil or the like. A transmitter 16 is responsive to a pulse generator 18 which provides timing pulses thereto whereby electrical energy which may be in the form of pulses is applied to the search unit 8. The search unit 8 may include a transducer which, when energized by an electrical impulse, provides mechanical vibrations in the form of ultrasonic waves into the structure of the patient 12. Reflections from substructures such as internal objects are reflected back into the search unit 8 whereby they impinge upon the transducer therein and corresponding electrical signals are provided to a receiver 20. The receiver 20, in turn, is coupled into a vertical deflection signal generator 22 which provides vertical deflection signals to the vertical deflection plates 24 and 26 in a cathode ray oscilloscope tube 30.

The output of pulser 18 is also applied into the horizontal deflection signal generator 32 which provides horizontal deflection signals to the horizontal deflection plates 34 and 36 in cathode ray tube 30. Indexing signals are also coupled into the vertical deflection generator 22 by a signal from search unit 8 through an amplifier 40. The manner in which the indexing signal is obtained from the search unit 8 will be described in more detail hereinafter.

The search unit 8 shown generally in FIGS. 2 and 3 may be the type which is mounted into a frame 50 which includes a top 52 having a pair of parallel bars 53 dividing a pair of spaced supports 54 and 56 and a bottom 58 which includes a corresponding pair of parallel bars 60. The bottom 58 may have rounded edges 62 and 64 therein because it is this portion which is contacting the patient 12 during the scanning operation hereof.

A crossbar 66 spans across the bottom 58 of the frame 50 and is positioned into holes 68 and 70 so that the rod 66 will rotate therein. Suitable bearings (not shown) may be provided therein for this purpose.

A search unit housing 72 comprises a cylinder 76 which, in this particular embodiment, is shown as being conical and whereby the apex of the cone is firmly affixed into an opening in the bar 66 and protrudes therein, however end 78 is flush with the bottom curvative of the rod 66 and is in contact with the patient 66. The housing 72 is substantially hollow and may be sealed with a suitable barrier at the end 78 thereof to enclose a column of liquid couplant such as water or the like.

An ultrasonic transducer 80 is positioned at the top of the housing 72 and is adapted to receive and transmit electrical energy through the cable 82 which is connected into the transmitter 16 and receiver 20. The transducer 80 may be comprised of a piezoelectric crystal which is the type which vibrates in its thickness mode when subjected to an impulse of electrical energy. The electrical energy then is transmitted through the water couplant in the cylinder 72 into the patient 12 which is coupled thereto. The housing 72 is adapted to rock or oscillate on the rod 66. This rocking or oscillation is facilitated by the rod 66 being coupled to rotate or pivot in to the end members 60. A pair of protruding flanges 91 are mounted to the housing 72 at a spaced distance up from the rod 66 and include a hole 92 therethrough, a push rod 96 protrudes through the support member 54 of frame 50 and is pivotally mounted by a pin through the hole 92 through the protruding flanges 91.

A motor 100 is mounted to support member 54 on the frame 50 in a suitable manner. The motor 100 has a rotating shaft 102 protruding from one end thereof and a shaft 104 protrudes through the other end and rotates therewith. A cam 106 is mounted to shaft 102 and is adapted to rotate therewith and engage the push rod 96. A spring 108 is suitably positioned between the support member 54 and connected to the push rod 96 by a collar 110. Thus the cam 106 forces the push rod towards the housing 72 forcing it to move away from the end 54 and the spring 108 causes it to return to its original position. Thus by rotation of the motor 100 the housing 102 is rocked back and forth on the rod 66 causing the ultrasonic energy from transducer 80 to be scanned into the body 12.

A translucent light modulator 120 is coupled to the rod 104. The light modulator 120 is comprised of a translucent cylindrical member which is partially translucent and partially transparent to light. With reference to FIG. 4 the cylinder 72 is shown with an opening 122 therein which is transparent to light. A bracket 124 extends from the frame 50 and is substantially U-shaped and extends into the hollow portion of the cylinder 120. A light 126, as shown in FIG. 4, is then positioned inside of the cylinder 120 and is illuminated in a suitable manner. A photo diode 128 is mounted to the frame 50 and is positioned to be energized by the light 126 as the modulator 120 rotates with the motor 100. The photo diode 128 is alternately energized by the transparent translucent areas.

The output of photo diode 128 is coupled into the vertical deflection signal generator 22 (FIG. 1) to cause the vertical scan line therefrom to be indexed on the cathode ray tube 30 in a suitable manner.

Having thus described one preferred embodiment of this invention what is claimed is:

1. In combination with an ultrasonic testing system, a search unit to be accoustically coupled to a workpiece, said search unit comprising:
   a frame, said frame having a bottom adapted to be removably engagable with respect to the workpiece;
   a rod pivotally mounted to said frame adjacent the bottom thereof such that said rod is engagable with the workpiece;
   a transducer housing having first and second ends, said second end connected to said rod such that said housing is pivotally movable with respect to said frame;
   an ultrasonic transducer mounted within the first end of said housing to transmit ultrasonic energy through said housing to its second end and through said rod to said workpiece; and
   means connected between said frame and said housing for oscillating said housing relative to said frame about the pivotal axis of said rod, said means including a motor and a cam rotatably driven by said motor, said motor having an output shaft which is connected to said cam, said cam being eccentrically mounted upon said shaft, a push rod longitudinally slidably mounted upon said frame, one end of said push rod being pivotally connected to said housing and the other end of said push rod being in contact with said cam, and spring means connected between said frame and said push rod to exert a constant bias on said push rod tending to maintain such in contact with said cam.

2. The system as defined in claim 1 wherein:
said cam comprises a circular shaped disc.

3. The system as defined in claim 2 wherein:
said second end of said housing is conically shaped with the apex thereof being connected to said pivotally mounted rod.

4. In combination with an ultrasonic testing system, a search unit to be acoustically coupled to a workpiece, said search unit comprising:
- a frame, said frame to be removable in respect to the workpiece;
- a housing mounted by a first means to said frame, said housing being pivotally movable in respect to said frame, said housing having a first end and a second end, said second end to be acoustically coupled to the workpiece;
- an ultrasonic transducer mounted in said first end of said housing and adapted to transmit ultrasonic energy through said housing to the second end thereof;
- second means connected to said housing to oscillate said housing relative to said frame, said second means including a motor and a cam rotatably driven by said motor, said motor having an output shaft which is connected to said cam, said cam being eccentrically mounted upon said shaft;
- indexing means coupled to said motor for movement in unison with said cam, said indexing means including a hollow cylinder rotatable with said cam, said hollow cylinder being at least partially translucent and partially transparent, a light source disposed within said hollow cylinder, light source responsive means disposed exteriorly of said hollow cylinder and activatable by said light source such that said light source responsive means provides a signal representing the position of said cam and thus also representing the position of said housing relative to said frame; and
- a video display means, said search unit connected to said video display means to display an output signal developed by the ultrasonic transducer of said search unit, said video display having a horizontal sweep to develop a horizontal trace thereacross, said display means having a vertical deflection system connected to said indexing means to vertically display said trace in accordance with the output of said light source responsive means whereby a plurality of horizontal traces at different vertical display positions are displayed by said display means with the vertical position of said trace representing the position of said housing relative to said frame.

5. The system as defined in claim 4 wherein:
said light source responsive means comprises a photo diode fixidly located upon said frame.

6. The system as defined in cliam 4 wherein:
said first means comprises a pivot rod pivotally mounted upon said frame, said second end of said housing connected to said rod and adapted to be acoustically coupled through a portion of said rod to the workpiece, such that said second end of said housing is capable of being in acoustical contact with the workpiece, and said rod and said housing being pivotally movable as a single unit in respect to said frame.

7. The system as defined in claim 6 wherein:
a push rod is longitudinally slidably mounted upon said frame, one end of said push rod being pivotally connected to said housing, the other end of said push rod to contact said cam.

8. The system as defined in claim 7 wherein:
spring means is connected between said frame and said push rod to exert constant bias on said push rod tending to maintain such push rod in contact with said cam.

9. The system as defined in claim 8 wherein:
said cam comprises a circular shaped disc.

10. The system as defined in claim 9 wherein:
said second end of said housing is conically shaped with the apex thereof being connected to said pivot rod.

* * * * *